July 13, 1954 J. L. FLENTIE 2,683,403
TRACTOR MOUNTED LISTER OR BEDDER
Filed July 13, 1949 2 Sheets-Sheet 1

Inventor
John L. Flentie
Louis V. Schiaro
by
Attorney

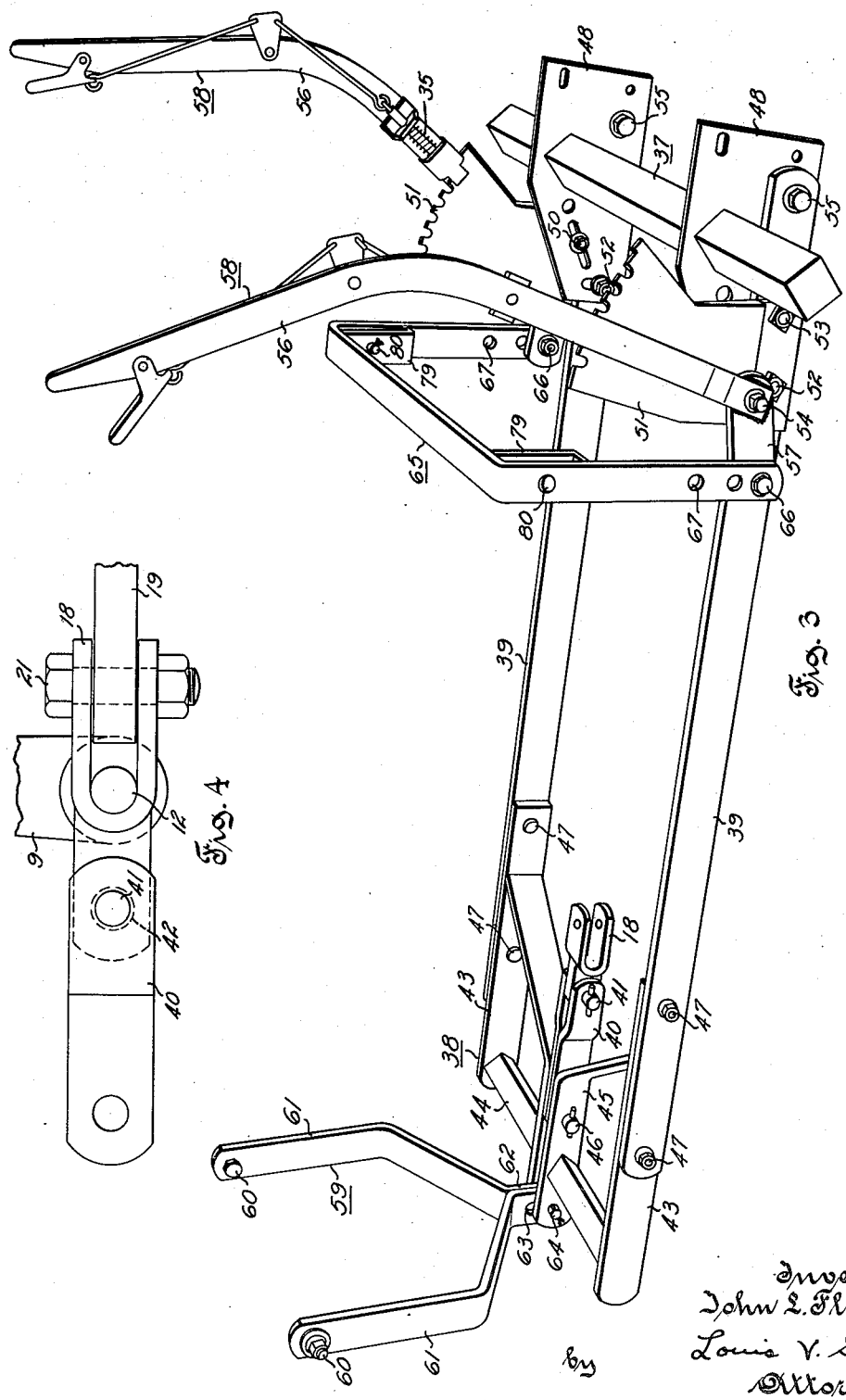

Patented July 13, 1954

2,683,403

UNITED STATES PATENT OFFICE 2,683,403

TRACTOR MOUNTED LISTER OR BEDDER

John L. Flentie, Whiting, Kans., assignor to Allis-Chalmers Manufacturing Company, Milwaukee, Wis., a corporation of Delaware Application July 13, 1949, Serial No. 104,578

16 Claims. (Cl. 97—46.07)

The present invention relates to agricultural implements of the type comprising a frame wholly supported on any suitable form of traveling vehicle, hereinafter called a tractor, and is more particularly concerned with the provision of an implement of this type incorporating improved features of design and construction enabling the use of numerous different types of tools and affording material advantages as to ease of attachment, control and adjustment.

In working ground with the implements directly supported on a tractor, particularly in the initial plowing of the ground, one of the rear traction wheels travels in an opened furrow while the other of these wheels travels on the higher unplowed ground. This condition causes the tractor to tilt to one side and necessitates the provision of some means for laterally tilting the implement relative to the tractor in order that the implement may be properly leveled relative to the ground and maintained in such a position. And if the tractor-implement combination travels back and forth across a field, as distinguished from traveling around the field, it is necessary to readjust the position of the implement at each end of the field. In addition, it is desirable and practically necessary to provide some means effecting lateral stability of the implement for all positions throughout its range of vertical movement.

The prior art teaches various ways of obtaining this adjustment, a common way being to support the opposite ends of a transverse tool bar on gauge wheels mounted for independent vertical adjustment relative to each other, thus providing means for laterally tilting the tool bar relative to the tractor in order to level the bar relative to the ground. Another way is to appropriately tilt the tool shank relative to the tool bar or to similarly tilt the tool shank and bar as a unit relative to the implement frame and tractor. However, these known leveling adjustments have not been entirely satisfactory in that the adjustment of gauge wheels mounted at opposite ends of a tool bar requires considerable time and is particularly objectionable if it is necessary to so level the implement at each end of the field. The same objection is present with respect to implements embodying a plurality of tools requiring an independent adjustment of each tool shank relative to its carrying bar. And in the case of implements leveled through actuation of tractor mounted levers, considerably more time is required in attaching and detaching such implements as it is usually necessary to connect or disconnect several control links. Moreover, the provision of tractor mounted levers sometimes interferes with the use of the tractor for other purposes, thus necessitating the removal of such levers.

Accordingly, an object of the present invention is to provide a tractor with an improved underslung implement attachment comprising a tool supporting frame and adjusting mechanism combined to form a unitary base structure designed for operatively mounting numerous different types of tools and including parts detachably secured to tractor carried supports affording a laterally stabilized and readily disconnectable three-point suspension.

Another object of this invention is to provide an improved implement attachment comprising a tool supporting frame and control mechanism combined to form a unitary base structure rendered operative to function as a centering device stabilizing the lateral position of the implement and/or to afford leveling, depth and/or beaming adjustments of its tool carrying parts upon attachment of the unitary base structure to a tractor.

Still another object of the present invention is to provide a tractor with a unitary underslung implement structure carried by supports affording a readily disconnectable three-point suspension functioning to stabilize the lateral position of the unitary structure, the latter including mechanism rendered operative to effect one or more of the aforementioned adjustments through a manual actuation of control elements positioned within easy reach of a person seated at the operator's station on the tractor upon connecting the unitary structure to said supports.

A further object of this invention is to provide a tractor with an improved underslung implement attachment comprising a tool supporting frame and adjusting mechanism combined to form a unitary base structure which is detachably secured to tractor carried supports providing a readily disconnectable three-point suspension affording bodily fore and aft movement of the unitary base structure relative to the tractor.

The present invention also relates to tractors having a draft regulating mechanism including a control element pivotally supported for fore and aft swinging movement in response to variations in a draft induced force, and still another object of this invention is to provide such a tractor with a unitary underslung implement structure detachably secured to tractor carried supports providing a three-point suspension affording bodily fore and aft movement of the unitary structure in position for ready connection with said control element.

The construction and operation of apparatus incorporating the invention will become readily apparent as the disclosure progresses and points out additional objects and advantages considered of special importance. And accordingly the present invention may be considered as comprising the various features of construction and/or combination hereinafter more fully set forth in the detailed description and appended claims, reference being had to the accompanying drawings, in which:

Fig. 3 is a perspective view of the implement frame connected to a drawbar attaching clevis and to the tractor carried front support;

Fig. 4 is an enlarged view showing in detail the connection of the implement frame to the draft regulating element of the tractor.

Figure 1:
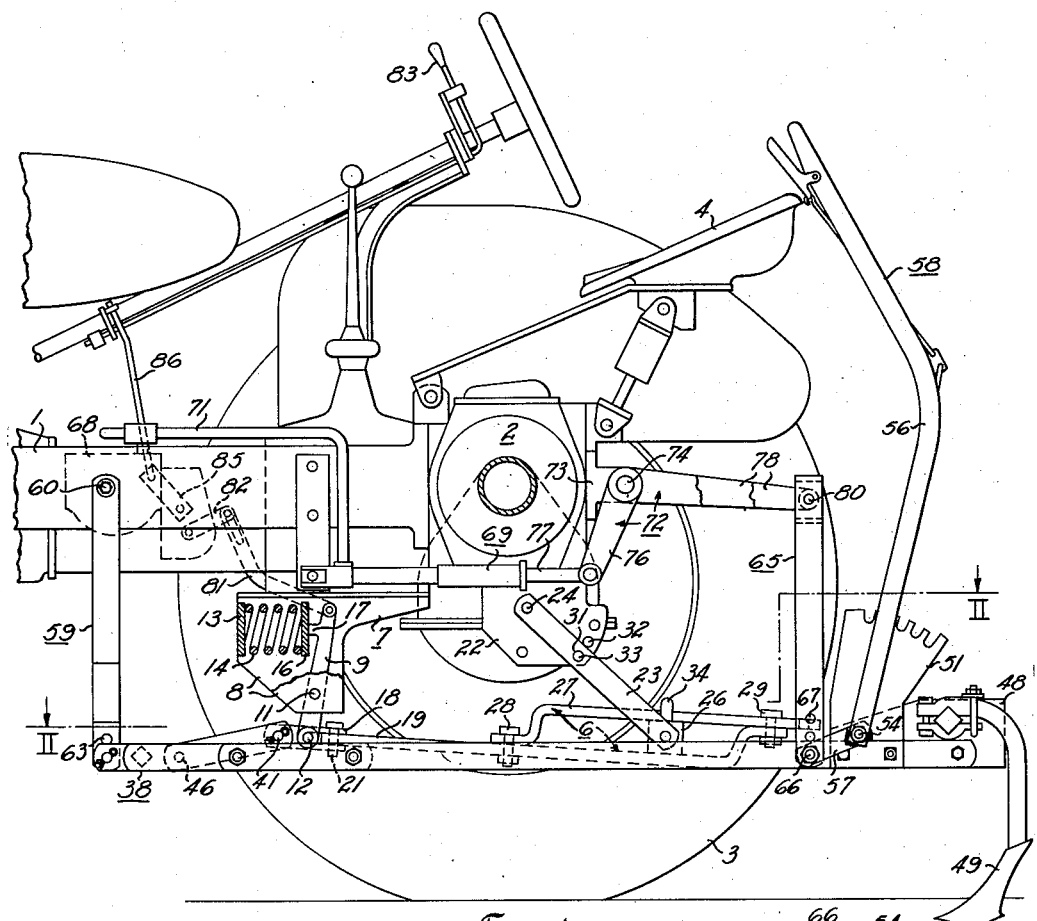
Fig. 1 is a side elevation of the rear portion of a tractor with the near side wheel omitted in the interest of clarity.

Referring particularly to Fig. 1, it will be seen that the tractor element of the combination comprises a frame structure 1 mounting a rear axle housing 2 supported on widely spaced ground engaging rear traction wheels 3 mounted at opposite ends thereof in a conventional manner, and an operator's seat or station 4 mounted in central superposed spaced relation on a rear portion of the tractor, whereas the implement element of the combination comprises an underslung frame structure, the details and mounting of which will be hereinafter more fully described.

The tractor is provided with a draft regulating apparatus comprising a draw bar structure 6 and a front support 7 therefor, the latter comprising a pair of laterally spaced plate members 8 fixed in depending relation to the under portion of the tractor, as by welding, immediately forward of and below axle structure 2. A lever 9 is positioned between and carried by plate members 8 for swinging movement relative thereto about a transverse axis by means of a pivot pin 11 which extends through aligned openings in opposed lower portions of plate members 8 and through an intermediate portion of lever 9. The lower portion of this lever is bifurcated and has aligned transverse openings therethrough affording bearing means supporting opposite end portions of a pivot pin 12 which affords means for connecting a draw bar or other draft inducing structure to the lower end of lever 9. Movement of lever 9 in response to a draft induced force applied to the lower portion thereof is resisted by a spring means comprising a fixed seat 13 carried by upper forward portions of plate members 8 in transverse relation thereto, a compression spring 14 having one end abutting seat 13, and a plate member 16 fixed to the opposite end of the spring and engaging a forward projection 17 on an upper portion of lever 9.

Draw bar structure 6 (see also Fig. 4) comprises a clevis 18 and an elongated bar member 19 connected thereto. The clevis embraces an intermediate portion of pivot pin 12, being free to turn thereabout, and being thereby disposed between the bifurcations of lever 9. The arms of this clevis extend rearwardly and receive therebetween a forward end portion of bar member 19, these parts being pivotally interconnected by means of a bolt 21 inserted through vertically aligned openings in said arms and bar member. This connection affords a relative swinging movement of the bar member about a vertical axis.

Draw bar structure 6 is additionally supported by means comprising a pair of similar plate members 22 (of which only the near one is shown) fixed to the under portions of rear axle structure 2 in depending relation thereto and in laterally spaced and generally parallel relation with respect to each other. A pair of similar strap members 23 have upper ends pivotally mounted on coaxially aligned pins 24 (of which only one is shown) carried by plate members 22 and are thereby disposed to extend rearwardly and downwardly in transverse alignment along the laterally outer sides of said plate members. Opposite end portions of a guide bar 26 are secured to opposed lower end portions of these strap members, thereby providing a bail structure swingable about the transverse pivot axis afforded by pins 24. Drawbar structure 6 also includes a guide strap 27 having a downwardly offset forward end portion secured to an intermediate top side portion of bar member 19, as by bolt 28, and bar member 19 has an upwardly offset rear end portion secured to an intermediate bottom side portion of guide strap 27, as by bolt 29. Consequently, the main portion of guide strap 27 is disposed in overlying vertically spaced parallel relation to the underlying portion of bar member 19. Guide bar 26 extends through the opening between guide strap 27 and bar member 19 thus affording a sliding movement of the bail structure relative to draw bar 6 as the bail is swung vertically about its pivot axis. Openings 31 intermediate the ends of strap members 23 are alignable with an arcuate series of similar openings 32 spaced along the rear portion of plate members 22 and the insertion of pins 33 through selectively aligned openings fixes the vertical position of the draw bar. In addition, a U-bolt 34 is secured to an intermediate portion of guide bar 26 in embracing relation to guide strap 27, the arms of the U-bolt acting to prevent lateral swinging movement of the draw bar structure relative to the bail.

The implement includes a frame structure comprising a rigid transverse tool carrying bar 37, a yoke 38, and a pair of rigid similar side members 39. Yoke 38 comprises a pair of similar strap members 43 having opposed forward end portions thereof fixedly united by a rigid cross bar 44 and having rear end portions fixedly secured in overlapped side abutting relation to the opposed inner side surfaces presented by forward end portions of side members 39. The forward end portion of the frame structure, that is the yoke 38, is additionally braced by a pair of similar members 45 having forward portions fixedly secured, as by welding, to an intermediate portion of cross bar 44 and having laterally diverging rear portions rigidly terminally secured, as by welding, to rear inner side portions of strap members 43. The forward portions of members 45 are disposed in adjacent parallel relation and extend forwardly a short distance beyond cross bar 44. The body portion of a clevis 46 is disposed between opposed portions of brace members 45 to the rear of cross members 44 and is secured thereto for swinging movement of the clevis about a transverse horizontal axis afforded by the attaching pivot pin 46, this clevis extending rearward between the diverging rear portions of brace members 45 and having its rear end connected with a forward extension of draw bar clevis 18 by means of a horizontal pivot pin 41. Side members 39 are preferably secured to strap members 43 by bolts 47, and extend rearwardly therefrom in parallel laterally spaced relation to one another.

A pair of similar plate members 48 are rigidly secured, as by welding, to spaced portions along 37, these plate members being thereby disposed in normal relation to the longitudinal axis of the bar. Plate members 48 are connected to inner opposed rear end portions of side members 39 by means of bolts 52 and 55 inserted through aligned openings in these members, the openings in the plate members receiving bolts 52 being elongated to afford pivotal adjustment of the plate members about a common transverse pivot axis provided by the aligned bolts 55. In addition, each plate 48 is provided with an elongated opening which receives a bolt 50 positionable by reason of said opening to bear against the upper edge of the associated bar 39, the said bolt, when so positioned and drawn tight against the side of the plate, acting as a stop for aiding bolt 52 maintain any selected position of the plate.

A pair of similar manually operated lever assemblies are mounted on outer oposed rear portions of side members 39 in partially overlapping relation to plate members 48. Each assembly comprises a ratchet plate 51 having a lower portion rigidly secured to the associated side member, as by the bolts 52 and 53, bolts 52 also being employed in attaching plate members 48 thereto, and having an outwardly offset upper portion provided with a set of teeth along the upper edge thereof. A lower section of the outwardly offset upper portion mounts an outwardly projecting pivot bolt 54 which supports a rigid lever comprising a pair of angularly disposed arms 56 and 57. Arm 56 extends generally upward from pivot bolt 54 and alongside ratchet plate 51 to a point within easy reach of a person seated at the operator's station 4, whereas arm 57 extends generally forward from said bolt and adjacent the outer side of frame member 39. Arm 56 is provided with a conventional latch means 35 engageable with the teeth of a ratchet plate to maintain this lever in a selected position of adjustment. And a further description of this latch assembly is deemed unnecessary for a clear understanding of this invention.

Figure 2:
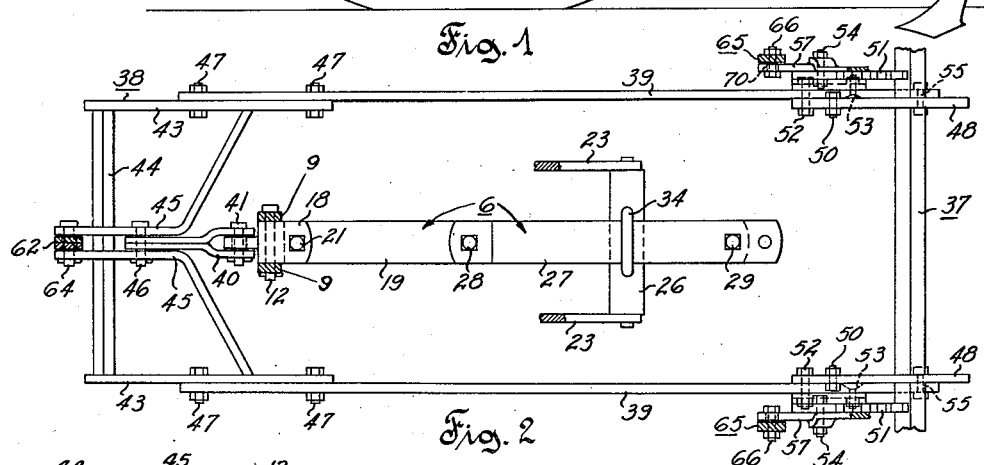
Fig. 2 is a plan view of the implement frame taken on line II—II of Fig. 1.

The front of the implement is supported from the tractor by a generally U-shaped hanger 59 having opposite end portions secured to transversely spaced portions of frame structure 1 by a pair of pivot bolts 60, this hanger being thereby disposed in depending underslung relation to the tractor frame for swinging movement about a horizontal transverse axis. The outer side surfaces of frame structure 1 are closely adjacent the arms of the hanger and thereby act to resist a lateral displacement thereof. This hanger is formed by a pair of similar strap members 61 terminally secured together, as by welding, to form a part 62 adapted to be disposed between the forward end portions of brace members 45. This part is provided with a pair of vertically spaced oversized openings 63, and a pivot bolt 64 is inserted through a selected one of these openings and through aligned openings in the forward end portions of brace members 45 thus affording a relative swinging movement of the hanger and implement frame about a horizontal transverse axis. The forward free end portions of lever arms 57 are supported on an upwardly extending U-shaped hanger 65 having lower end portions of the legs pivotally secured to these arms as by bolts 66. Preferably, the hanger legs are provided with a series of transversely aligned vertically spaced holes 67 to afford adjustment of the connection between the lever arms and hanger. And in this connection it should be noted that the bolt receiving holes in lever arms 57, designated 70, are somewhat oversize as best shown in Fig. 2.

The tractor is provided with a hydraulic implement lift means comprising a pump 68 deriving power from the tractor engine (not shown), a ram 69 receiving fluid from the pump through a conduit 71, and a ram actuated lift mechanism 72. The lift mechanism includes a pair of plate members 73 (of which only one is shown) fixed to and extending rearwardly from laterally spaced portions of rear axle structure 2 in generally parallel spaced relation, a rock shaft 74 rotatably mounted in transversely aligned bearing means (not shown) carried by plate members 73 and suitably preventing a lateral displacement of this shaft, an actuating arm 76 terminally rigidly connected to shaft 74 and extending forwardly downward therefrom with its free end pivotally connected to the rearwardly extending piston rod 77 of ram 79, and a pair of similar lift arms 78 terminally rigidly connected to longitudinally spaced portions of shaft 74 and extending rearwardly therefrom in transverse alignment for connection of their free ends to the upper end portions of hanger 65. A pair of similar L-shaped strap members 79 have opposite end portions secured, as by welding, respectively, to the bight and the associated leg of hanger 65, one arm of each of said members being thereby disposed in parallel inner spaced relation to the associated leg of hanger 65. The free ends of lift arms 78 are disposed between these parallel arms and are secured thereto for relative pivotal movement about a horizontal transverse axis by a pair of attaching pivot bolts 80.

Figure 1 shows the implement element of the combination in working position. In order to overcome the resistance of the ground to advancement of the working tools 49 therethrough a draft force is applied to said tools by the tractor through pivot pin 12, clevises 18 and 40 and the implement frame structure. Pivot pin 12 swings fore and aft with the lower portion of lever 9, its position being determined by the magnitude of the draft force and the resistance offered by the compressive force of spring 14 acting on the upper end of lever 9. And it will be noted that the movement of this lever is transmitted to suitable control mechanism enclosed in pump housing 68 by means of a link 81 having a pivotal connection with the upper end of lever 9 and a lost motion (pin and slot) connection with a control arm 82 exterior to the pump housing. Also, a manually operated lever 83 within reach of an operator seated at his station 4 on the tractor is connected to the mechanism controlling pump 68 through a link 86 and a lever 85 exterior to the rear side of the pump housing. And in general, it should be understood that the action of the pump is controlled by the movements of lever 9 effected by variations in draft force, and that manually actuated lever 83 affords a superimposed or dominating control operative to determine the working depth of the tools and to selectively lift, hold and lower the implement, as desired. In this connection, an operative coaction between control arm 62 and lever 85 may be established in any suitable manner, for example, as disclosed in U. S. Patent 2,611,307, issued September 23, 1952, to Walter F. Strehlow and Igor Kamlukin.

Figure 5:
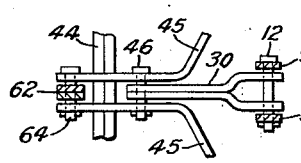
Fig. 5 is a partial plan view similar to Fig. 2 showing the implement frame directly connected to the draft regulating element instead of indirectly connected thereto through the drawbar structure.

Since the draw bar structure 6 is connected to pivot pin 12 it moves fore and aft with said pin but is prevented from swinging horizontally by the nature of its connection with bight portion 26 of the draw bar supporting bail, the latter being vertically fixed by the pins 33 inserted through straps 23 and fixed plates 22. As pivot pin 12 swings about the axis of pivot pin 11 it will tend to rotate slightly about its own axis, and consequently pivot pin 12 is adapted to turn in clevis 18, which cannot swing freely about pivot pin 12 by reason of its connection to bar member 18. The implement frame is wholly supported from the tractor by means of hangers 59 and 65, these hangers affording a fore and aft swinging movement of the implement frame about the parallel horizontal axes defined, respectively, by the pivot bolts 60 and 80, the implement frame moving vertically generally parallel to the ground. Clevises 18 and 40 afford means for connecting pivot pin 12 to the implement frame to thereby effect a fore and aft movement of lever 9 in response to variations in the draft induced force acting thereon. In this connection, since drawbar structure 6 does not influence the operation of the working tools 49, it should be apparent that, if desired, draw bar structure 6 may be detached from pivot pin 12 and that a clevis 30 long enough to engage said pin directly, as shown in Fig. 5, instead of through clevis 18 may be used in lieu of clevis 40 to again render the implement frame operative to transmit the draft induced force to lever 9.

When the rear end of the implement frame is raised or lowered by the actuation of lift arms 78 or by the actuation of hand lever 58, the frame swings about the horizontal transverse pivot axis afforded by bolt 64, the pivotal connections at opposite ends of clevis 40 affording vertical angular displacement of this clevis relative to the implement frame. Thus it will be seen that the connection of the implement frame to pivot pin 12 does not prevent a vertical swinging movement of the frame about pivot pin 64. In addition, the relation between this frame and clevis 40 is such that the perpendicular distance between pin 41 and the frame, as viewed in Fig. 1, is less than the distance between pins 41 and 46, clevis 40 being thereby disposed generally forward of pin 41 for transmitting a thrust force from pin 12 and clevis 18 to the frame. In other words, the selected length of clevis 40 is such that only a limited vertical angular displacement thereof is permitted, said displacement being such that when the clevis is disposed in thrust transmitting relation to the frame it is maintained in said relation throughout the entire range of movement of said frame.

Hangers 59 and 65 are connected, respectively, directly to the tractor frame and directly to the lift mechanism, which in turn is carried by the tractor in a manner to prevent lateral displacement thereof. Since the implement frame is carried by these hangers it is obvious that it is secured against lateral displacement throughout the range of its vertical swinging movement. In addition, it is obvious that connection of the implement frame to these hangers at three widely spaced points, namely, at pivot bolt 64 and at pivot bolts 66, secures the frame against any rotation in a horizontal plane which might result from the resistance to advancement of the tools on one side of the tractor being greater than the resistance on the other side. Consequently, a frame thus mounted functions as a centering device operative to stabilize laterally the position of ground working tools carried by the frame.

The vertically spaced openings 63 in part 62 and the vertically spaced openings 67 in the bottom end portions of hanger 65 afford the opportunity, respectively, of selecting the line of draft and of roughly adjusting the depth to which the implement works. The lower one of openings 63 is utilized when deeper penetration is desired, and the upper one is utilized when a lesser degree of penetration is desired. The lower one of openings 67 is for deep penetration of the ground working tools, the center opening is for average penetration, and the upper opening is for shallow penetration.

To raise or lower the ground working tools, lift arms 78 may be swung about the axis of rock shaft 74 by power derived from the tractor and utilized through the medium of rams 69. Further adjustment of the vertical position of the ground working tools is obtained by simultaneously manipulating manually operated levers 58 in the same direction, in which case lever arms 57 swing about pivot bolts 54 to change the effective distance between the free ends of lift arms 78 and the implement frame.

When the tractor is tilted laterally, as when only one wheel is to travel in an opened furrow, the implement frame is leveled with respect to the ground by manipulating levers 58 so that they engage, respectively, forward and rearward portions of ratchet plates 51. Thus lever arms 57 are swung vertically in opposite directions so that the effective vertical distance between the lift arm 78 on one side of the tractor and the implement frame is made greater than the effective vertical distance between the lift arm 78 on the other side of the tractor and the implement frame. When the field is recrossed, it is necessary to tilt the implement frame the other way, and it will be seen that it is important to provide quick acting means convenient to the operator seated at his station 4 on the tractor for effecting this adjustment. Therefore, levers 58 are arranged so that they can be reached by the operator without the necessity of his dismounting. In this connection, it will be observed that the connections between part 62 and brace members 45, clevises 18 and 40, and bars 57 and the arms of hanger 65 are made loose to accommodate this tilting movement.

It should now be obvious that the implement attachment comprises a frame structure and control mechanism combined to provide a unitary base structure for mounting numerous different types of tools, said structure being mountable directly on the tractor through tractor carried supports affording a readily disconnectable three-point suspension. Also, when the unitary base structure is mounted on the tractor it is positioned in underslung relation thereto and thereby disposed for ready connection with a control element carried by the tractor for fore and aft swinging movement in response to variations in the draft force, said structure moving fore and aft with the control element. And upon mounting the unitary base structure on the tractor it functions as a centering device stabilizing the lateral position of the implement throughout the vertical swinging range thereof. Also, said structure functions to afford leveling and/or depth and/or beaming adjustment of its tool carrying parts. And, it will be noted that one or more of the aforementioned adjustments may be effected through manual actuation of the control mechanism positioned within easy reach of the person seated at the operator's station on the tractor.

It should be obvious that although the apparatus herein disclosed as embodying the invention has particular utility in the tilling of soil, certain features are of more general application and that, therefore, it is not intended to limit the invention to the exact construction and combination herein shown and described for purposes of illustration as various modifications within the scope of the appended claims may occur to persons skilled in the art.

It is claimed and desired to secure by Letters Patent:

1. In combination with a tractor carrying a vertically movable lift mechanism, an implement comprising an elongated generally rectangular frame and adjusting mechanism combined to form a unitary underslung base structure presenting a front hanger having a horizontal pivot connection between a lower end portion thereof and a front central portion of said frame and between an upper end portion thereof and said tractor, said unitary structure also presenting an upwardly extending rear hanger having spaced laterally opposed upper portions thereof pivotally connected with correspondingly spaced portions of said lift mechanism and having spaced laterally opposed lower portions supportingly connected with correspondingly spaced portions of said frame through separate means each of which is independently adjustable to vary the relative vertical position of the frame and hanger portions connected thereby, and said hangers affording bodily fore and aft movement of said frame about generally parallel horizontal pivot axes and said front hanger affording vertical swinging movement of said frame in response to an actuation of said lift mechanism.

2. In combination with a tractor carrying a draft element supported for fore and aft movement in response to variations in a draft induced force applied thereto, and carrying a lift mechanism connected with and responsive to movements of said draft element, an implement comprising an elongated generally rectangular frame and adjusting mechanism combined to form a unitary base structure presenting a front hanger having a horizontal pivot connection between a lower end portion thereof and a front central portion of said frame and between an upper end portion thereof and said tractor, said unitary structure also presenting an upwardly extending rear hanger comprising a part of said adjusting mechanism and having spaced laterally opposed upper portions thereof pivotally connected with correspondingly spaced portions of said lift mechanism, said hangers affording bodily fore and aft movement of said frame about generally parallel horizontal pivot axes and said front hanger affording vertical swinging movement of said frame in response to an actuation of said lift mechanism, and link means detachably pivotally connecting a forward central portion of said frame in force transmitting relation to said draft element.

3. In combination with a tractor having a lift mechanism and having a draft control element supported for fore and aft movement in response to variations in a draft induced force applied thereto, an implement comprising an elongated tool supporting frame and adjusting mechanism combined to form a unitary base structure presenting an upwardly extending front hanger detachably connected with said tractor and an upwardly extending rear hanger detachably connected with vertically movable parts of said lift mechanism, said hangers and detachable connections positioning said unitary structure to extend beneath said tractor and including elements coacting to provide a readily disconnectable three point suspension laterally stabilizing the position of said frame and comprising a front central pivot support and laterally spaced rear pivot supports, said pivot supports affording fore and aft movement of said unitary structure relative to said tractor with a portion of said frame disposed adjacent an end portion of said control element, and link means detachably pivotally connecting said portion of said frame in force transmitting relation to said control element and affording a vertical swinging movement of said frame about a transverse axis afforded by said front pivot support, said adjusting mechanism including lever parts positioned within easy reach of a person seated at the operator's station on the tractor and being rendered operative to effect leveling and depth adjustments of the tool carrying portions of said frame upon attaching said unitary base structure to said tractor.

4. In combination with a tractor carrying a draft element supported for fore and aft movement in response to variations in a draft induced force applied thereto, carrying a lift mechanism connected with and responsive to movements of said draft element, and carrying an elongated draft structure having a front end portion thereof connected with a horizontal pivot support carried by said draft element and having a rear portion thereof mounted on a vertically adjustable fixed support carried by the tractor and affording a limited fore and aft movement of the draft structure relative to the tractor, an implement comprising an elongated frame and adjusting mechanism combined to form a generally rectangular unitary base structure presenting an upwardly extending front hanger pivotally detachably connected with a portion of said tractor in advance of said draft element and a rear hanger comprising a part of said adjusting mechanism pivotally and detachably connected with a portion of said lift mechanism to the rear of said draft element, said hangers and detachable connections positioning said unitary structure to extend beneath the tractor in spaced surrounding relation to said draft structure and including elements coacting to provide front and rear pivot supports mounting said unitary structure for vertical swinging movement about said front pivot support and for fore and aft movement relative to said tractor, and link means pivotally and detachably connecting a front central portion of said frame in thrust transmitting relation to a front end portion of said draft structure.

5. In combination with a tractor carrying a draft element supported for fore and aft movement in response to variations in a draft induced force applied thereto, carrying a lift mechanism connected with and responsive to movements of said draft element, and carrying an elongated draft structure having a front end portion thereof connected with a horizontal pivot support carried by said draft element and having a rear portion thereof mounted on a vertically adjustable fixed support carried by the tractor and affording a limited fore and aft movement of the draft structure relative to the tractor, an implement comprising an elongated generally rectangular frame and adjusting mechanism combined to form a unitary base structure presenting a front hanger having a horizontal pivot connection between a lower end portion thereof and a front central portion of said frame and between an upper end portion thereof and said tractor, said unitary structure also presenting an upwardly extending rear hanger comprising a part of said adjusting mechanism and having spaced laterally opposed upper portions thereof pivotally connected with correspondingly spaced portions of said lift mechanism, said hangers affording bodily fore and aft movement of said frame about generally parallel horizontal pivot axes and said front hanger affording vertical swinging movement of said frame in response to an actuation of said lift mechanism, and link means detachably pivotally connecting a forward central portion of said frame in force transmitting relation to a front end portion of said draft structure.

6. In combination with a tractor, an implement comprising an elongated tool supporting frame and adjusting mechanism combined to form a unitary base structure presenting an upwardly extending Y-shaped front hanger having a horizontal pivot connection between its stem part and a front central portion of said frame and having axially aligned horizontal pivot connections between its laterally opposed spaced upper portions and opposite sides of said tractor, said unitary base structure also presenting an upwardly extending inverted U-shaped rear hanger having axially aligned horizontal pivot connections between laterally opposed spaced upper portions thereof and correspondingly spaced portions of the tractor and having axially aligned horizontal pivot connections between laterally opposed spaced lower portions thereof and correspondingly spaced portions of said adjusting mechanism, said adjusting mechanism including lever parts positioned within each reach of a person seated at the operator's station on the tractor and being rendered operative to effect leveling and depth adjustments of the tool carrying portions of said frame upon attaching said unitary base structure to said tractor.

7. In combination with a tractor having a lift mechanism presenting a pair of laterally spaced generally parallel arms simultaneously vertically swingable about a transverse pivot axis, an implement comprising an elongated tool supporting frame and adjusting mechanism combined to form a unitary base structure presenting an upwardly extending Y-shaped front hanger having a horizontal pivot connection between its stem part and a front central portion of said frame and having axially aligned horizontal pivot connections between its laterally opposed spaced upper portions and correspondingly spaced portions of the tractor, said unitary base structure also presenting an upwardly extending inverted U-shaped rear hanger having axially aligned horizontal pivot connections uniting laterally opposed upper portions thereof with free end portions of said lift arms and having axially aligned horizontal pivot connections between laterally opposed spaced lower portions thereof and correspondingly spaced portions of said adjusting mechanism, said adjusting mechanism including lever parts positioned within easy reach of a person seated at the operator's station on the tractor and being rendered operative to effect leveling and depth adjustments of the tool carrying portions of said frame upon attaching said unitary base structure to said tractor.

8. In combination with a tractor having a lift mechanism presenting a pair of laterally spaced generally parallel arms simultaneously swingable about a transverse pivot axis, an implement comprising an elongated unitary frame structure including laterally space side members and a rear tool supporting cross member secured to opposed rear end portions of said side members for limited vertical adjustment relative thereto about a transverse horizontal pivot axis generally parallel to said cross member, an upwardly extending Y-shaped front hanger having a horizontal pivot connection between its stem part and a front central portion of said frame and having axially aligned horizontal pivot connections between its laterally opposed upper portions and correspondingly spaced portions of said tractor in advance of said lift arms, a pair of levers pivotally supported on opposed rear portions of said side members for independent pivotal movement about axially aligned transverse pivot axes, said levers presenting a pair of similar forwardly extending rigid arm portions, an upwardly extending inverted U-shaped rear hanger having laterally opposed lower portions thereof pivotally supported on laterally aligned portions of said forwardly extending lever arms and having laterally opposed upper portions thereof pivotally secured to free end portions of said lift arms, and latch mechanism including parts fixed on said frame and coacting parts carried by said levers for retaining the latter in selected positions of adjustment, said levers including handle portions positioned within easy reach of a person seated at the operator's station on the tractor upon attaching said frame to said tractor.

9. In combination with a tractor having a lift mechanism presenting a pair of laterally spaced generally parallel arms simultaneously swingable about a transverse pivot axis, and having a centrally disposed draft element supported for fore and aft movement in response to variations in a draft induced force applied thereto, an implement comprising an elongated unitary frame structure including laterally spaced side members and a rear tool supporting cross member secured to opposed rear end portions of said side members for limited vertical adjustment relative thereto about a transverse horizontal pivot axis generally parallel to said cross member, an upwardly extending Y-shaped front hanger having a horizontal pivot connection between its stem part and a front central portion of said frame and having axially aligned horizontal pivot connections between its laterally opposed upper portions and correspondingly spaced portions of said tractor in advance of said lift arms and adjacent said draft element, a pair of levers pivotally supported on opposed rear portions of said side members for independent pivotal movement about axially aligned transverse pivot axes, said levers presenting a pair of similar forwardly extending rigid arm portions, an upwardly extending inverted U-shaped rear hanger having laterally opposed lower portions thereof pivotally supported on laterally aligned portions of said forwardly extending lever arms and having laterally opposed upper portions thereof pivotally secured to free end portions of said lift arms, link means detachably pivotally connecting a central forward portion of said frame to the rear of said front hanger in force transmitting relation to said draft element and affording a vertical swinging movement of said frame about its pivot support on the stem portion of said front hanger, and latch mechanism including parts fixed on said frame and coacting parts carried by said levers for retaining the latter in selected positions of adjustment, said levers including handle portions positioned within easy reach of a person seated at the operator's station on the tractor upon attaching said frame to said tractor.

10. An implement attachable in underslung relation to a tractor and comprising an elongated unitary frame structure including laterally spaced side members and a rear tool supporting cross member secured to opposed rear end portions of said side members for limited vertical adjustment relative thereto about a transverse horizontal pivot axis generally parallel to said cross member, an upwardly extending Y-shaped front hanger having a horizontal pivot connection between its stem part and a front central portion of said frame, a pair of levers pivotally supported on opposed rear portions of said side members for independent pivotal movement about axially aligned transverse pivot axes, said levers presenting a pair of similar forwardly extending rigid arm portions, an upwardly extending inverted U-shaped rear hanger having laterally opposed lower portions thereof pivotally supported on laterally aligned portions of said forwardly extending rigid lever arms, and latch mechanism including parts fixed on said frame and coacting parts carried by said levers for retaining the latter in selected positions of adjustment.

11. An implement attachable in underslung relation to a tractor and comprising an elongated unitary frame structure including laterally spaced side members and a rear tool supporting cross member secured to opposed rear end portions of said side members for limited vertical adjustment relative thereto about a transverse horizontal pivot axis generally parallel to said cross member, an upwardly extending front hanger having a horizontal pivot connection between a lower end portion thereof and a front central portion of said frame, a pair of levers pivotally supported on opposed rear portions of said side members for independent pivotal movement about axially aligned transverse pivot axes, said levers presenting a pair of similar forwardly extending rigid arm portions, an upwardly extending rear hanger having laterally opposed lower portions thereof pivotally supported on laterally aligned portions of said forwardly extending lever arms, and latch mechanism including parts fixed on said frame and coacting parts carried by said levers for retaining the latter in selected positions of adjustment.

12. An implement attachable in underslung relation to a tractor and comprising an elongated unitary frame structure including laterally spaced side members and a rear tool supporting cross member secured to opposed rear end portions of said side members, an upwardly extending front hanger having a horizontal pivot connection between a lower end portion thereof and a front central portion of said frame, a pair of levers pivotally supported on opposed rear portions of said side members for independent pivotal movement about axially aligned transverse pivot axes, said levers presenting a pair of similar forwardly extending rigid arm portions, an upwardly extending rear hanger having laterally opposed lower portions thereof pivotally supported on laterally aligned portions of said forwardly extending lever arms, and latch mechanism including parts fixed on said frame and coacting parts carried by said levers for retaining the latter in selected positions of adjustment.

13. In combination with a tractor, an implement comprising an elongated tool supporting frame and adjusting mechanism combined to form a unitary underslung base structure presenting upwardly extending front and rear hangers detachably connected with longitudinally spaced portions of said tractor, said hangers and detachable connections comprising a readily detachable three-point suspension having a front pivot support disposed in a vertical plane extending longitudinally of the tractor and having a pair of laterally stabilizing rear supports spaced longitudinally of the tractor from said front support, said rear supports being aligned laterally in symmetrical relation to said plane and each including a lever mounted on said frame in upwardly extending independently shiftable relation thereto with a lower portion of said lever having a supported connection with an adjacent portion of the rear one of said hangers, said levers extending upward to a point within easy reach of a person seated at the operator's station on the tractor and being operative to effect leveling and depth adjustments of the tool carrying portions of said frame upon attaching said unitary base structure to said tractor.

14. In combination with a tractor carrying a vertically movable lift mechanism, an implement comprising an elongated generally rectangular frame and adjusting mechanism combined to form a unitary underslung base structure presenting a front hanger having a horizontal pivot connection between a lower end portion thereof and a front central portion of said frame and between an upper end portion thereof and said tractor, said unitary structure also presenting an upwardly extending rear hanger having spaced laterally opposed upper portions thereof pivotally connected with correspondingly spaced portions of said lift mechanism and having spaced laterally opposed lower portions supportingly connected with correspondingly spaced portions of said frame through separate means each of which is independently adjustable to vary the relative vertical position of the frame and hanger portions connected thereby, and said separate means each including an upstanding part disposed within each reach of a person seated at the operator's station on the tractor.

15. An implement attachable in underslung relation to a tractor and comprising an elongated unitary frame structure including laterally spaced side members and a rear tool supporting cross member secured to opposed rear end portions of said side members, an upwardly extending front hanger having a horizontal pivot connection between a lower end portion thereof and a front central portion of said frame, and an upwardly extending rear hanger having spaced laterally opposed upper portions adapted for pivotal connection with correspondingly spaced portions of a tractor carried lift mechanism and having similar spaced lower portions supportedly connected with correspondingly spaced portions of said frame through separate means each including a lever part which extends toward beyond said rear hanger and is independently shiftable to vary the relative vertical position of the frame and hanger portions connected thereby.

16. An implement attachable in underslung relation to a tractor and comprising an elongated unitary frame structure including laterally spaced side members and a rear tool supporting cross member secured to opposed rear end portions of said side members, an upwardly extending front hanger having a horizontal pivot connection between a lower end portion there of and a front central portion of said frame, an upwardly extending rear hanger having spaced laterally opposed lower portions disposed adjacent to and adjustably connected with correspondingly spaced portions of said frame, said adjustable connections comprising a pair of levers pivotally supported on two of said spaced portions for independent turning movement about axially aligned transverse pivot axes, and a pair of rigid arms similarly projecting from and operatively connecting each of said levers with the proximate one of the other two of said spaced portions.

References Cited in the file of this patent

UNITED STATES PATENTS

| Number | Name | Date |
|---|---|---|
| 2,118,180 | Ferguson | May 24, 1938 |
| 2,319,670 | Ego | May 18, 1943 |
| 2,358,281 | Ray | Sept. 12, 1944 |
| 2,372,459 | Todd | Mar. 27, 1945 |
| 2,412,362 | Silver | Dec. 10, 1946 |
| 2,436,155 | Silver | Feb. 17, 1948 |
| 2,611,307 | Strehlow et al. | Sept. 23, 1952 |

FOREIGN PATENTS

| Number | Country | Date |
|---|---|---|
| 253,566 | Great Britain | June 14, 1926 |